(12) United States Patent
Maddox et al.

(10) Patent No.: US 10,681,032 B2
(45) Date of Patent: Jun. 9, 2020

(54) SYSTEM AND METHOD FOR VOICE AUTHENTICATION

(71) Applicant: ONVOCAL, INC., Northborough, MA (US)

(72) Inventors: John Maddox, Northborough, MA (US); Richard A. Smith, Annapolis, MD (US); William W. Graylin, Winchester, MA (US)

(73) Assignee: OV LOOP, INC., Woburn, MA (US)

( * ) Notice: Subject to any disclaimer, the term of this patent is extended or adjusted under 35 U.S.C. 154(b) by 85 days.

(21) Appl. No.: 15/610,535

(22) Filed: May 31, 2017

(65) Prior Publication Data

US 2017/0359334 A1    Dec. 14, 2017

Related U.S. Application Data

(60) Provisional application No. 62/344,373, filed on Jun. 1, 2016.

(51) Int. Cl.
| | |
|---|---|
| H04L 29/06 | (2006.01) |
| G06F 3/16 | (2006.01) |
| G06N 3/00 | (2006.01) |
| G10L 15/22 | (2006.01) |
| G10L 15/30 | (2013.01) |
| G10L 17/06 | (2013.01) |
| G10L 17/24 | (2013.01) |

(52) U.S. Cl.
CPC .......... *H04L 63/0815* (2013.01); *G06F 3/167* (2013.01); *G06N 3/006* (2013.01); *G10L 15/22* (2013.01); *G10L 15/30* (2013.01); *G10L 17/06* (2013.01); *G10L 17/24* (2013.01); *H04L 63/0861* (2013.01); *H04L 63/0884* (2013.01); *G10L 2015/223* (2013.01)

(58) Field of Classification Search
CPC ............ H04L 63/0815; H04L 63/0884; H04L 63/0861; G06F 3/167; G10L 17/24; G10L 17/06; G10L 15/22; G10L 15/30; G10L 2015/223; G06N 3/006
See application file for complete search history.

(56) References Cited

U.S. PATENT DOCUMENTS

| | | | |
|---|---|---|---|
| 7,054,819 B1 * | 5/2006 | Loveland ................ | G06F 21/32 345/419 |
| 7,921,292 B1 * | 4/2011 | Pauker .................... | H04L 9/083 713/171 |
| 8,595,810 B1 * | 11/2013 | Ben Ayed ........... | H04L 63/0815 713/168 |
| 8,660,970 B1 * | 2/2014 | Fiedorowicz .......... | G06N 5/043 706/15 |
| 2002/0188854 A1 * | 12/2002 | Heaven ................... | G06F 21/10 713/186 |

(Continued)

OTHER PUBLICATIONS

International Search Report dated Aug. 29, 2017 from co-pending application No. PCT/US17/35318.

*Primary Examiner* — John B King
(74) *Attorney, Agent, or Firm* — Seyfarth Shaw LLP; Brian Michaelis

(57) ABSTRACT

A system and a method for single sign-on voice authentication that provides access to multiple voice recognition and artificial intelligence platforms, to multiple devices and to multiple third party web service systems.

12 Claims, 10 Drawing Sheets

(56) References Cited

U.S. PATENT DOCUMENTS

| | | | |
|---|---|---|---|
| 2006/0129840 A1* | 6/2006 | Milgramm | G06F 21/32 |
| | | | 713/186 |
| 2009/0106558 A1* | 4/2009 | Delgrosso | G06F 21/32 |
| | | | 713/184 |
| 2012/0023554 A1* | 1/2012 | Murgia | H04L 63/102 |
| | | | 726/4 |
| 2012/0144464 A1* | 6/2012 | Fakhrai | G06F 21/41 |
| | | | 726/6 |
| 2013/0132468 A1* | 5/2013 | Azeez | H04L 63/0815 |
| | | | 709/203 |
| 2014/0214676 A1 | 7/2014 | Bukai | |
| 2014/0279516 A1 | 9/2014 | Rellas et al. | |
| 2015/0332273 A1 | 11/2015 | Bruno | |
| 2015/0334099 A1* | 11/2015 | Zhang | H04L 63/0838 |
| | | | 726/6 |
| 2016/0012465 A1* | 1/2016 | Sharp | G06Q 20/18 |
| | | | 705/14.17 |
| 2017/0359334 A1* | 12/2017 | Maddox | G06N 3/006 |

* cited by examiner

SYSTEM AND METHOD FOR VOICE AUTHENTICATION

CROSS-REFERENCE TO RELATED APPLICATION DATA

The present application claims priority from U.S. Provisional Patent Application No. 62/344,373 filed on Jun. 1, 2016 which is hereby incorporated by reference in its entirety.

FIELD OF THE INVENTION

The present invention relates to a system and a method for voice authentication and in particular to a system and a method for single sign-on voice authentication.

BACKGROUND OF THE INVENTION

Voice authentication is a biometric type authentication where a speaker's identity is authenticated or verified via a voice signal that is compared to a prerecorded voice print. Voice authentication is usually applied in order to provide access to secure systems, such as bank accounts, credit accounts, databases, web services and systems that contain proprietary and/or secret data, medical records, financial records, personal records, government records and business records, among others.

In general, speaker recognition systems include voice authentication systems and voice identification systems. In voice authentication the identity of a user is authenticated based on a voice signal, whereas in voice identification a user is identified based on a voice signal. Each speaker recognition system has three phases: Enrollment, training and authentication. During enrollment, the speaker's information is registered into a database to identify who the user is and to establish an account. Then the speaker's voice is recorded and typically a number of features are extracted to form one or more recorded voice prints. In the training process, the system is trained to recognize the voice of a speaker. In the authentication phase, a voice signal of a speaker is compared against one or more previously created voice prints of the speaker. For identification systems, a voice signal of a speaker is compared against multiple voice prints of multiple speakers in order to determine the best match while authentication systems compare a speaker's voice signal against one or more stored voice prints of the speaker. Voice based speaker recognition systems have the advantages that they are non-contact systems, non-intrusive, easy to use and can be used for remote authentication.

Currently, most voice authentication systems are used for single platform applications, such as single web-service, single bank account, or single artificial intelligence (AI) device. These voice authentication systems require that the user registers with each individual platform/system and goes through the process of establishing individual voice based authentication accounts and credentials. This is a time consuming process and deters the users from using these voice based authentication systems for accessing individual bank accounts, web services or devices.

SUMMARY OF THE INVENTION

The present invention relates to a system and a method for single sign-on voice authentication that provides access to multiple voice recognition and artificial intelligence platforms, to multiple devices and to multiple third party web service systems.

DETAILED DESCRIPTION OF THE INVENTION

Figure 1A:
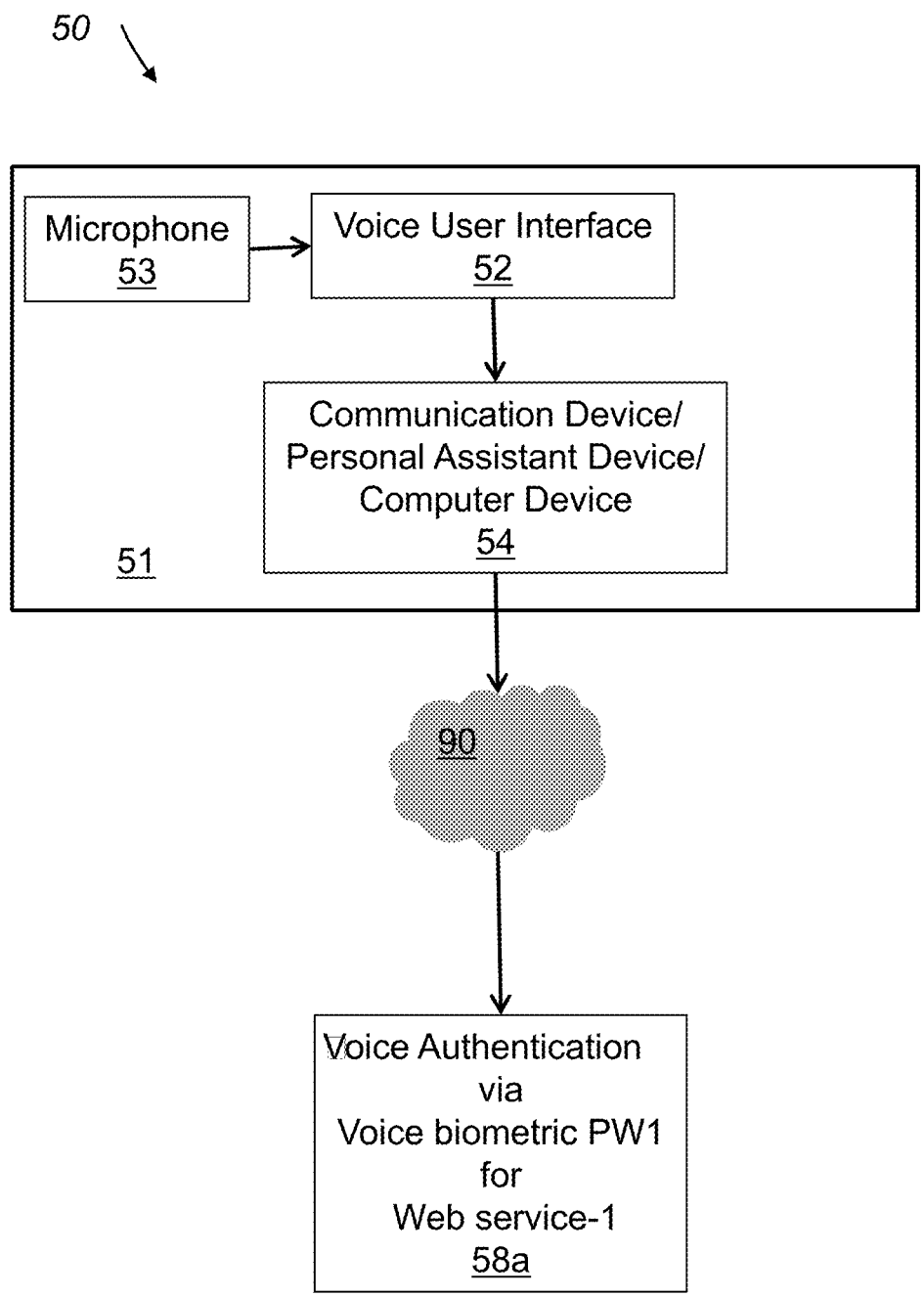
FIG. 1A depicts a block diagram of a prior art single platform voice authentication system.

Referring to FIG. 1, in a single platform voice authentication system 50, the voice of a user to be authenticated is captured by a microphone 53 and a voice user interface 52 that is associated with a communication device 54 and the captured voice signal is transmitted to an individual web service 58a, where it is authenticated prior to providing access to the web service. The communication device 54 may be a personal or public communication device such as a telephone, cell-phone, smart phone, a tablet, a laptop computer, a desktop computer, a television, a personal assistant device, a point of sale device, or any other mobile or non-mobile communication device that provides access to a service via a network connection. In some cases, device 54 is a dedicated artificial intelligence (AI) device that is associated with a specific web service. An example of a dedicated AI device is Amazon's Echo speaker associated with the Alexa voice web service. Other examples include Apple's phones or tablets that utilize the Siri voice service. The voice user interface 52 may be integrated within the communication device 54 or may be an external interface. Similarly, the microphone 53 may be integrated together with the communication device 54 in one communication system 51. The voice user interface 52 enables human interaction with the communication device 54 though a voice recognition platform in order to initiate a service or a process. Communication device 54 accesses the service 58a via a network connection 90. Network connection 90 may be any wired or wireless network. Service 58a may a bank account, an online wallet service, a credit account, an investment account, a health record account, or other accounts that contain proprietary and/or secret data, medical records, financial records, personal records, government records or business records, among others.

Figure 1B:
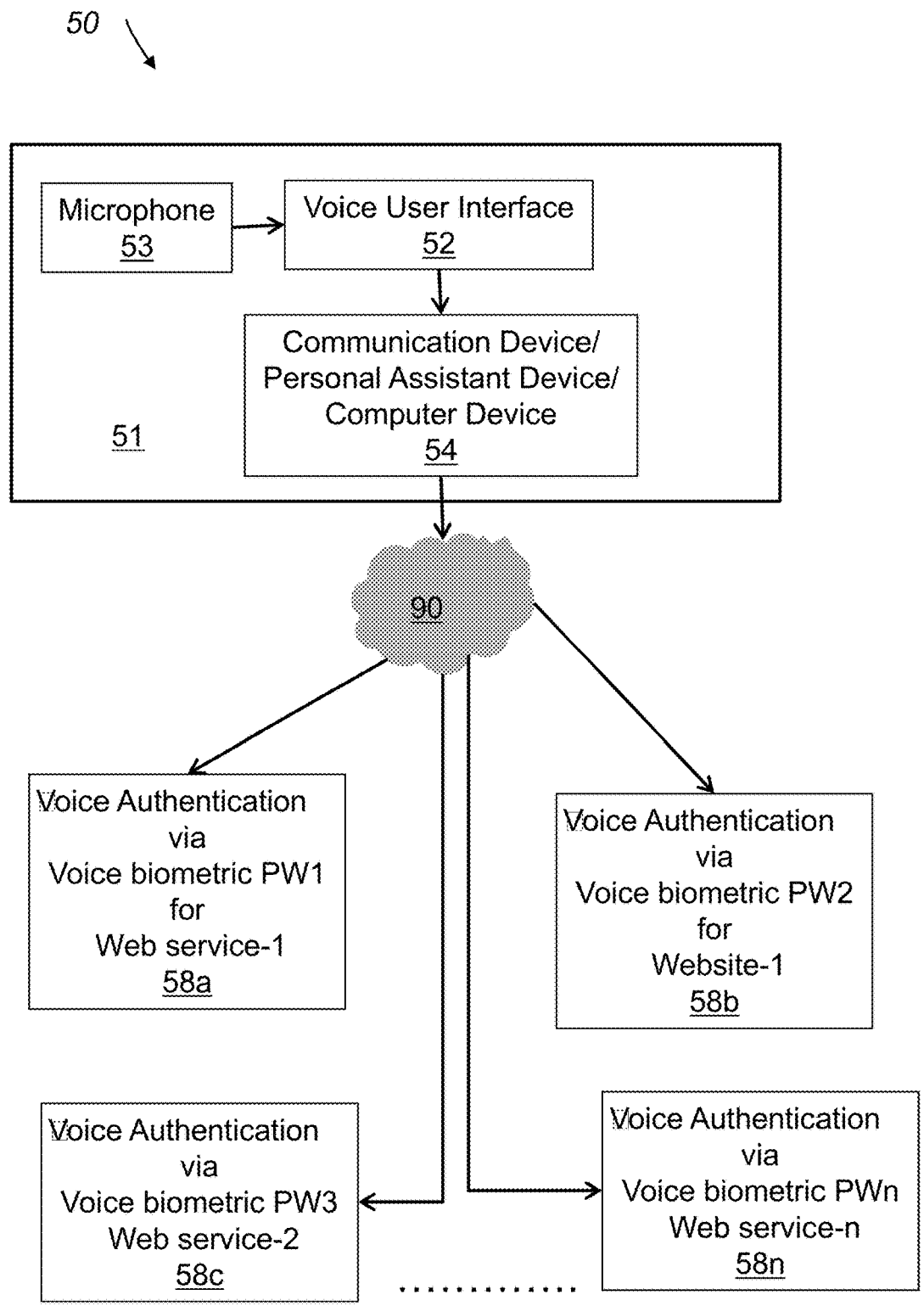
FIG. 1B depicts a block diagram of a prior art multi-point voice authentication system for accessing a plurality or web-services.

In most of the currently available systems, voice authentication is provided by the web service 58a. Referring to FIG. 1B, communication system 51 transmits a user's voice signal to separate web-services 58a, 58b, 58c, to 58n via the network connection 90. Each web-service provides its own voice authentication service via a locally stored voice biometric signal. These voice authentication systems require that the user registers with each individual platform/system and goes through the process of establishing individual voice based authentication accounts and credentials. This is a time consuming process and deters the users from using these voice based authentication systems for accessing individual bank accounts, web services or devices.

Figure 2:
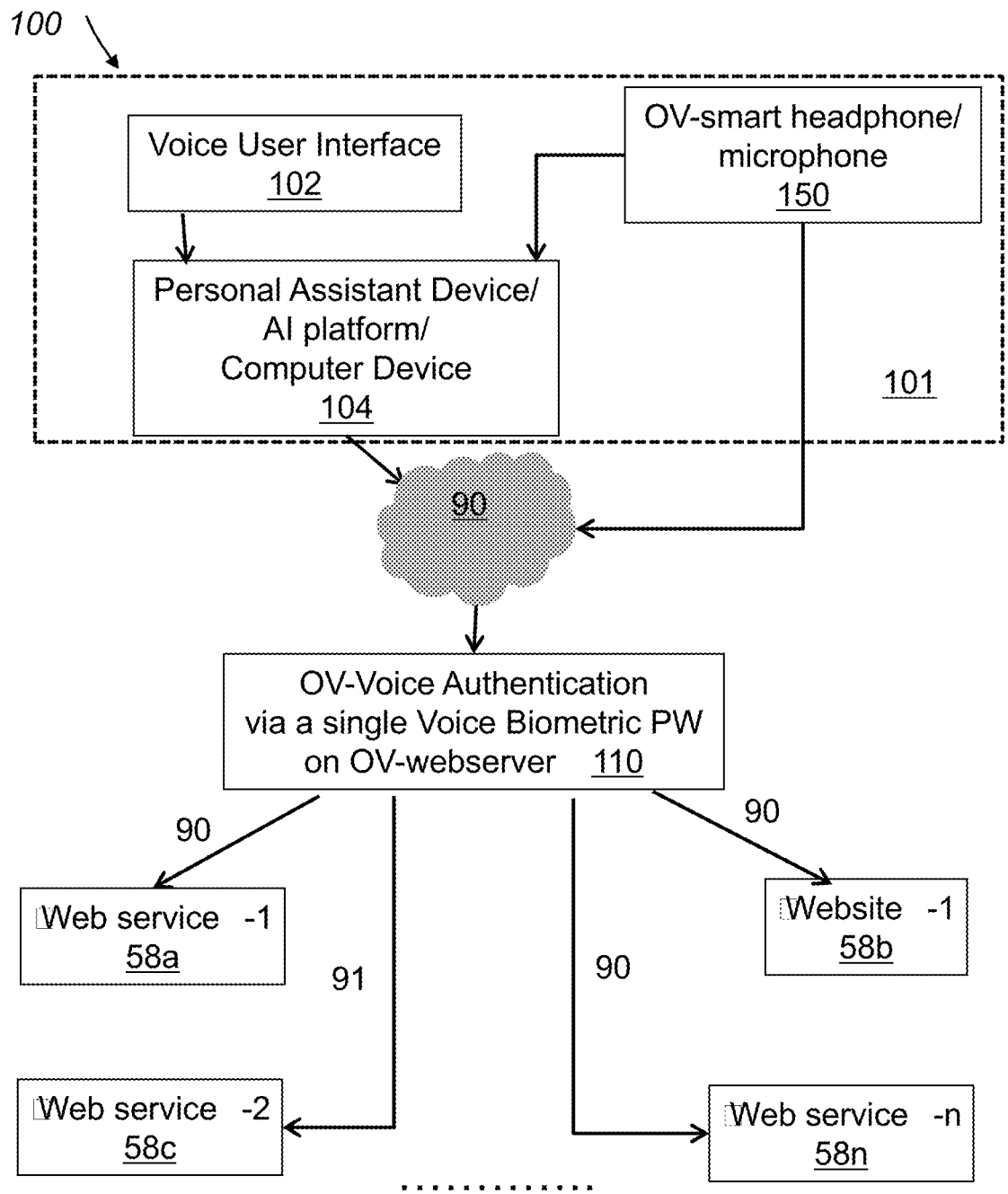
FIG. 2 depicts a block diagram of a single-point voice authentication system for accessing a plurality or web-services, according to this invention.

Referring to FIG. 2, a voice authentication system 100 according to this invention includes a communication system 101 and a central voice authentication server 110. The communication system 101 communicates with the central voice authentication server 110 via a network connection 90. The central voice authentication server 110 connects to web services 58a, 58b, 58c to 58n via the same network connection 90 or a dedicated network 91. Examples of network connections 90, 91 include the following: Internet, Ethernet, X.21, ISDN, Frame Relay, and cellular network connections such as GSM, CDMA, AMPS, GPRS, EDGE, UMTS, DECT, iDEN, among others.

Communication system 101 includes a voice user interface 102, a communication device 104 and a smart headphone/microphone device 150. The communication device 104 may be a personal or public communication device such as a telephone, cell-phone, smart phone, a tablet, a laptop computer, a desktop computer, a television, a personal assistant device, a point of sale device, or any other mobile or non-mobile communication device that provides access to a service via a network connection. In some cases, device 104 is a dedicated artificial intelligence (AI) platform that is associated with a specific device. An example of a dedicated AI platform is the Alexa voice service that is associated with Amazon's Echo speaker. Other examples include Apple's Siri that is associated with Apple's phones or tablets, Microsoft's Cortana voice service associated with devices running Microsoft's operating systems, and Facebook's M voice service. The smart headphone/microphone device 150 may be a smart headphone/microphone device. In one example, smart headphone/microphone device 150 is the ONvocal Mix360 headphone, described in U.S. Pat. No. 8,498,425 B2, the entire contents of which are incorporated herein by reference. The voice user interface 102 may be integrated within the communication device 104 or may be an external interface. In some examples, the voice user interface (VUI) 102 is the VUI provided by the AI platform, i.e., the Alexa VUI, Siri VUI, Cortana VUI, among others. Similarly, the smart headphone/microphone device may be integrated together with the communication device 104 in one communication system 101. In some examples, the VUI 102 may be an application sitting in communication device 104, and can interact with either the native microphone and speaker with device 104, or headsets and headphones attached to device 104 via wire or wireless connectivity.

Figure 3A:
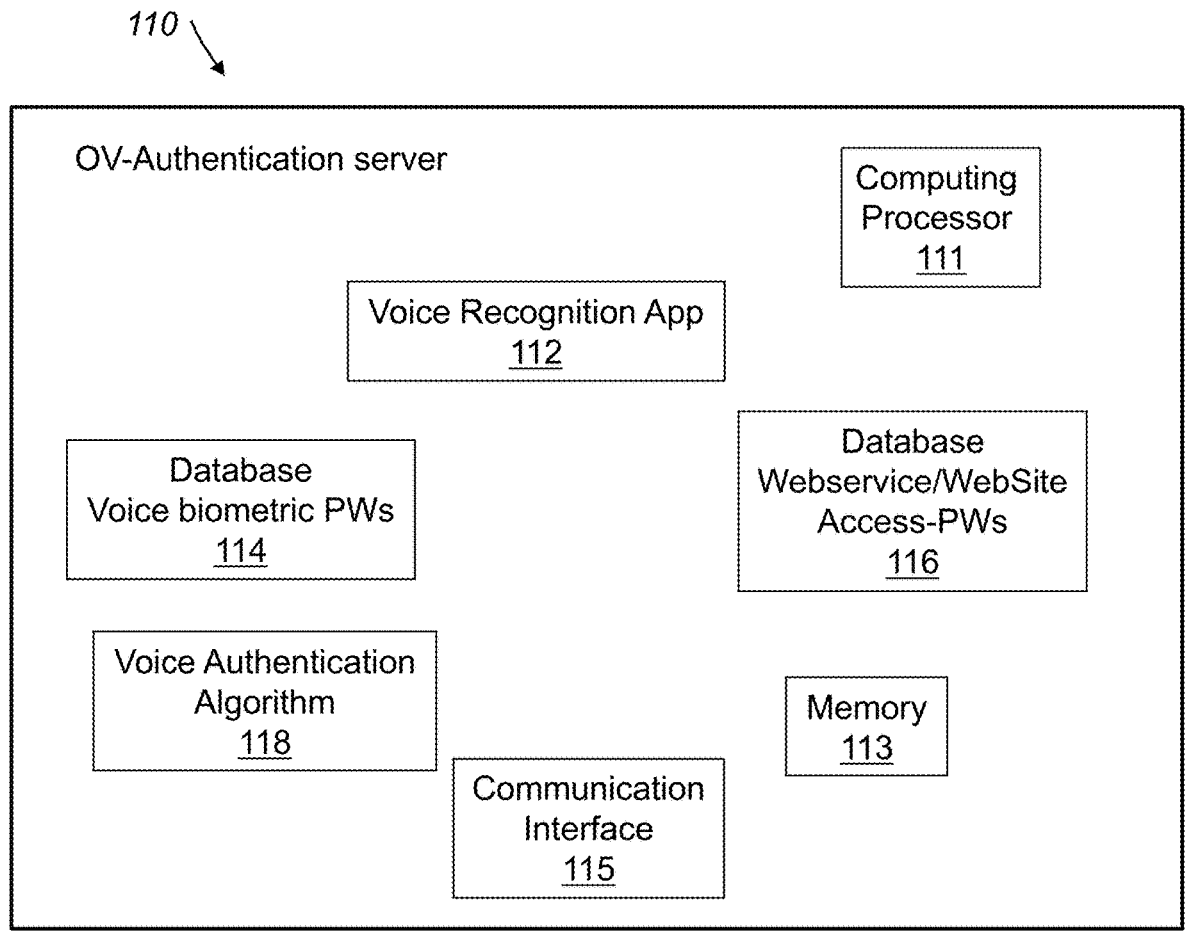
FIG. 3A depicts a block diagram of a single-point voice authentication server, according to this invention.

Referring to FIG. 3A, the central voice authentication server 110, includes a computing processor 111, a voice recognition application 112, a voice authentication algorithm 118, a first database 114 storing the voice biometric patterns of the registered users, and the second database 116 containing the accessible web-services and the corresponding access credentials for each registered user. The first database 114 also includes additional authentication credentials, such as challenge questions and answers, and passwords. The central voice authentication server 110 also includes a memory 113 and a communication interface 115. Voice recognition application 112 is any speech recognition application that translates speech into text representing the words contained in the spoken voice signal or extracts voice pattern information from the user's spoken vocal signal. The spoken vocal signal is analyzed with the speech recognition application 112 using methodologies such as Hidden Markov Modeling (HMM), dynamic time warping (DTW), neural networks, vocal tract length normalization (VTLN), among others.

Figure 3B:
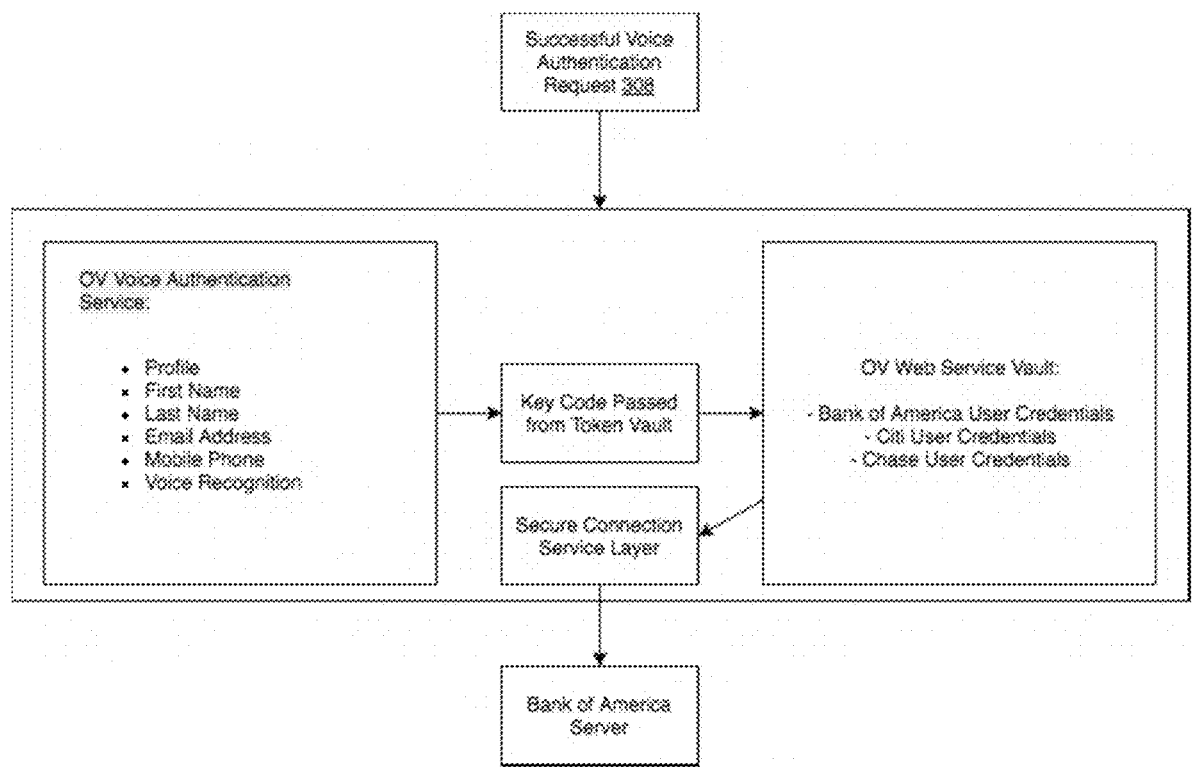
FIG. 3B depicts a block diagram of the single-point voice authentication server interface to a plurality of web services, according to this invention.

As illustrated in the scenario of FIG. 3B, a user has made a voice authentication request to the voice authentication server or service according to the disclosure. This has been successful request, and the user account has been correctly identified. A cloud service has a secure "wallet" of connected web services such as Bank Of America, Citi, and/or Chase credentials for the requesting user which are securely stored in a user credential vault. This vault is only accessible by a secure token service which encrypts/decrypts each access and generates a random access code each time it is requested. Once authenticated the service is open and connection to the Citi service is then provided.

Figure 4A:
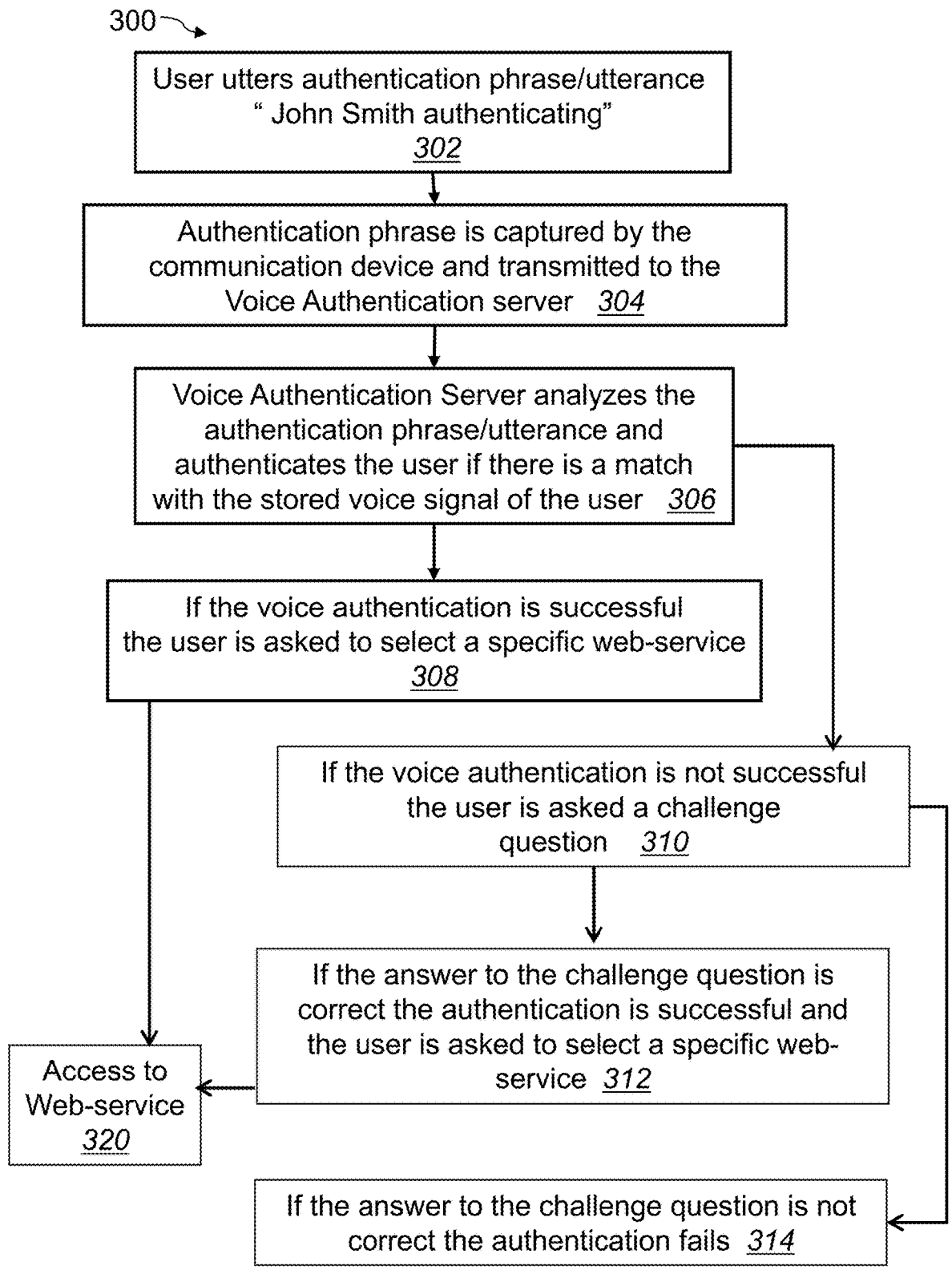
FIG. 4A depicts a process flow diagram for the single-point voice authentication according to this invention.

Referring to FIG. 4A, an authentication process 300 according to this invention includes the following steps. First a user utters a verbal authentication phrase in the presence of the communication system 101 (302). In one example, the authentication phrase includes a vocal authentication command which is comprised of the user's name followed by the command authenticating, i.e., "John Smith authenticating". Other examples of authentication commands include "Authenticate Me", a segment of a song, or any other specific phrase that the user chooses during the registration process, or a one-time-use PIN that is generated by the voice authentication server and repeated by the user. The authentication command is captured by the communication device 104 and is transmitted to the voice authentication server (304). The voice authentication server analyzes the authentication command by comparing it to the stored voice biometric pattern in the user's account in the first database 114 (306). If there is a match, the voice authentication is successful and the user is asked to select a specific web-service (308) and then access to the web-service is provided (320). If there is not a match the voice authentication is not successful and the user is asked a challenge question (310). The challenge questions and answers are also stored in the user's account in the first database 114 and are chosen during the registration process. If the answer to the challenge question is correct, the authentication is successful and the user is asked to select a specific web-service (312) and access to the web-service is provided (320). If the answer to the challenge question is not correct, the authentication fails (314).

Figure 4B:
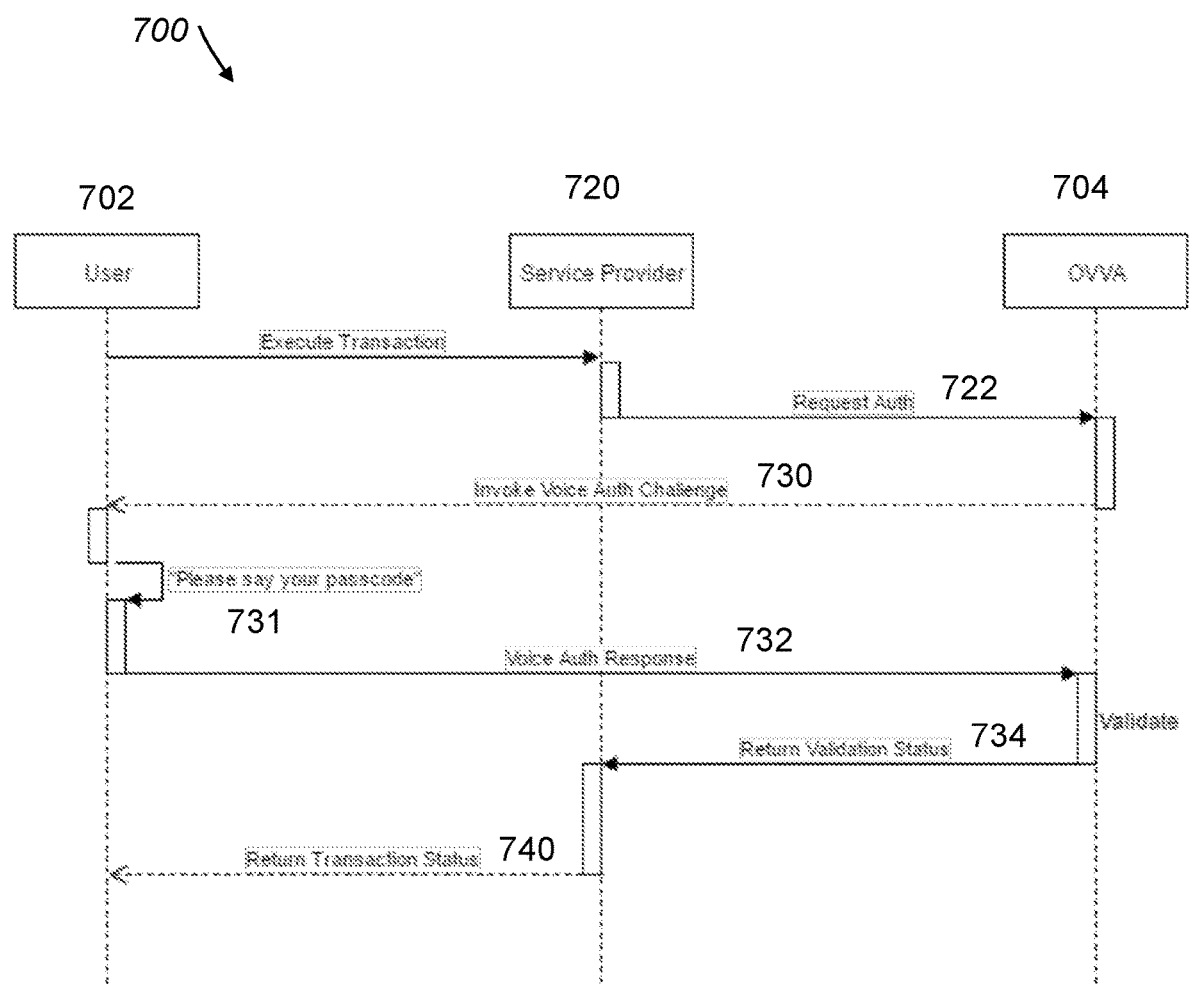
FIG. 4B depicts a signal flow diagram for the single-point voice authentication service interface to a plurality of web services according to this invention.

As illustrated in the scenario of FIG. 4B, if voice authentication of the user at the centralized voice authentication server is successful and the user is asked to select a specific web service (308, FIG. 4A), during access to the web-service provider (320) a user may be required to interact directly with the service provider, such as Bank of America. The Service Provider may communicate with the centralized authentication server to inquire whether the user is actively/fully authenticated for the service (e.g. are any further credentials or authorizations required). If no further authentication is required, then the user has already been authenticated for the service and access is allowed. If not, then the centralized authentication server will perform an out-of-band request to the user to provide voice print authentication. For example, further authentication may be required through an identity application running or downloaded to the user device or a communication may be sent from the authentication server to the user device. Once the user has authenticated, then the service provider can continue the transaction.

In the authentication process 700 illustrated in FIG. 4B, a user 702 interacts directly with the web service provider 720, such as PeoplePower or BoA. This interaction may be through an Alexa skill, an App, or a web page, among others. The web service provider 720 asks the authentication server 704 if the user is actively authenticated for the service (722). If this is the case, then the user has already proven their identity for the service and access is allowed. If this is not the case, then the authentication server 704 performs an out-of-band request to the user to provide voice print authentication (730). The out-of-band request may be performed through an identity application running on a smartphone or by making a phone call, among others. In one example, the out-of-band request includes asking the user to say their password (731). The user responds by saying their password and the authentication server compares the voice biometric pattern to the stored voiceprints of the user (732). Once the authentication server 704 has performed the authentication service and the user has been authenticated (734), then the service provider can continue the transaction (740).

Figure 5:
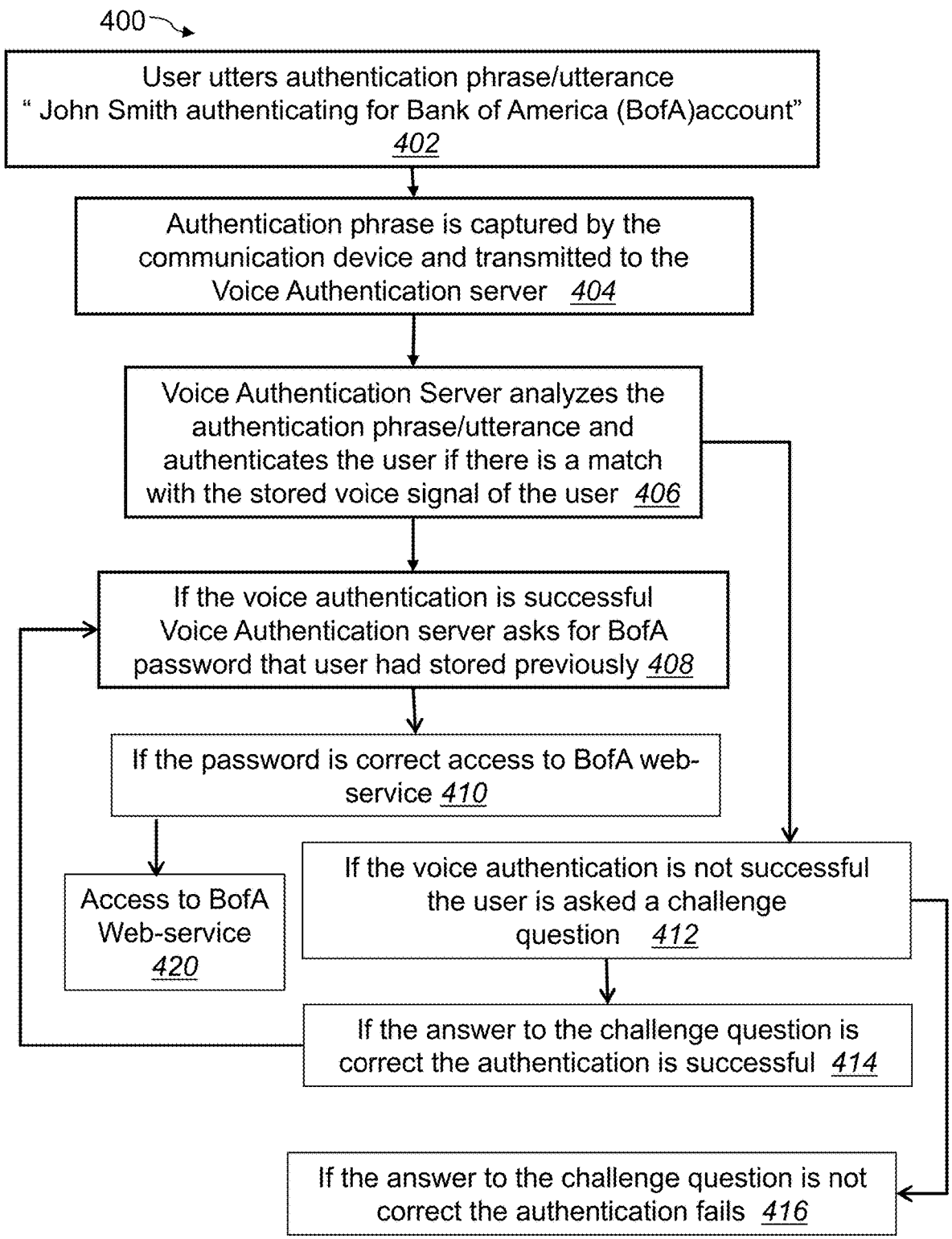
FIG. 5 depicts a process flow diagram of another embodiment of the single-point voice authentication according to this invention.

Referring to FIG. 5, in a further embodiment, an authentication process 400 according to this invention includes the following steps. First a user utters a verbal authentication phrase for a specific web service in the presence of the communication system 101 (402). In one example, the authentication phrase further includes a vocal selection command which may be a request for access to a specific web service following the user's name, i.e., "John Smith authenticating for Bank of America account". The authentication phrase is captured by the communication device 104 and is transmitted to the voice authentication server (404). The central voice authentication server 110 analyzes the authentication command by comparing a voice pattern extracted from the authentication command to the stored voice pattern in the user's account in the first database 114 (406). If there is a match with the stored voice pattern, the voice authentication is successful and the user provided password for the specific web-service is used to gain access to the web service (408). If the provided password is correct (410) access to the specific web-service is provided (420). If the voice authentication is not successful the user is asked a challenge question (412). The challenge questions and answers are also stored in the user's account in the first database 114 and are chosen during the registration process. If the answer to the challenge question is correct, the voice authentication is successful and the user is directed to step (408) and the password for the specific web-service (408) is used for access. If the password is correct (410), access to the specific web service is provided (420). If the answer to the challenge question is not correct, the authentication fails (416) and user is notified their password must be updated in the voice authentication app.

Figure 6:
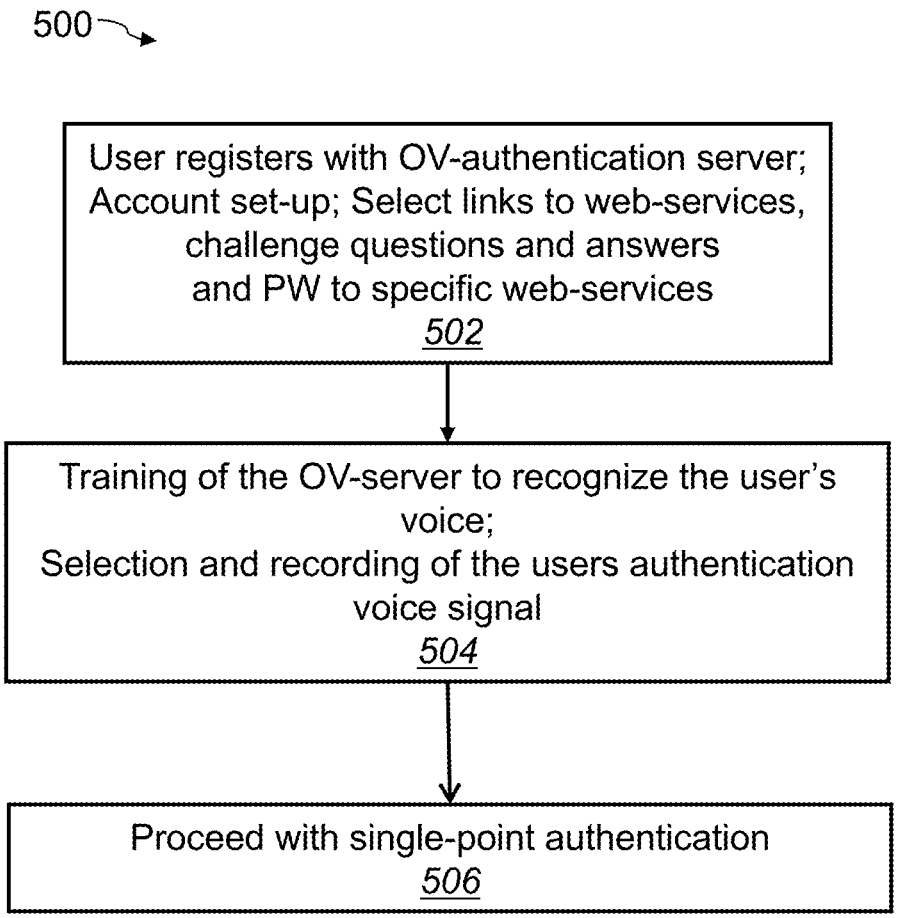
FIG. 6 depicts a process flow diagram for user registration into the single-point voice authentication system of the present invention.

Referring to FIG. 6, the user registration and enrollment process 500 includes the following steps. First the user registers with the authentication server and sets up an account (502). Registration data may include name, address, telephone number, e-mail, and other physical and online contact information. Registration data may also include a list of the web-services and the corresponding passwords that the user chooses to access via a single-point authentication. Examples of the selected web-services include commercial websites, bank accounts, investment accounts, medical record accounts, and business accounts, among others. Next, the user trains the system to recognize his/her voice and selects and records a voice and authentication voice signal, including numbers 0 to 9 to be used later for dynamic PIN authentication. (504). The training protocol for recognizing the voice of the user includes instructions to repeat specific words, phrases, numbers, and sing a song, among others. As was mentioned above, the user may select any type of phrase, utterance, number or segment of a song as their authentication voice biometric pattern and the selected voice pattern is recorded and stored in the server's first database 114. The user may also select the time to remain logged into the server, after being authenticated and to log out automatically after the selected time. For web services and accounts that contain sensitive data, proprietary data and data that need to remain secret, additional passwords are selected and stored in the database. In some embodiments, the user selects which web-services require a password for access and which do not. In other embodiments, the administrator of the web-services elects to use the password requirement for accessing the web-service or not.

Figure 7:
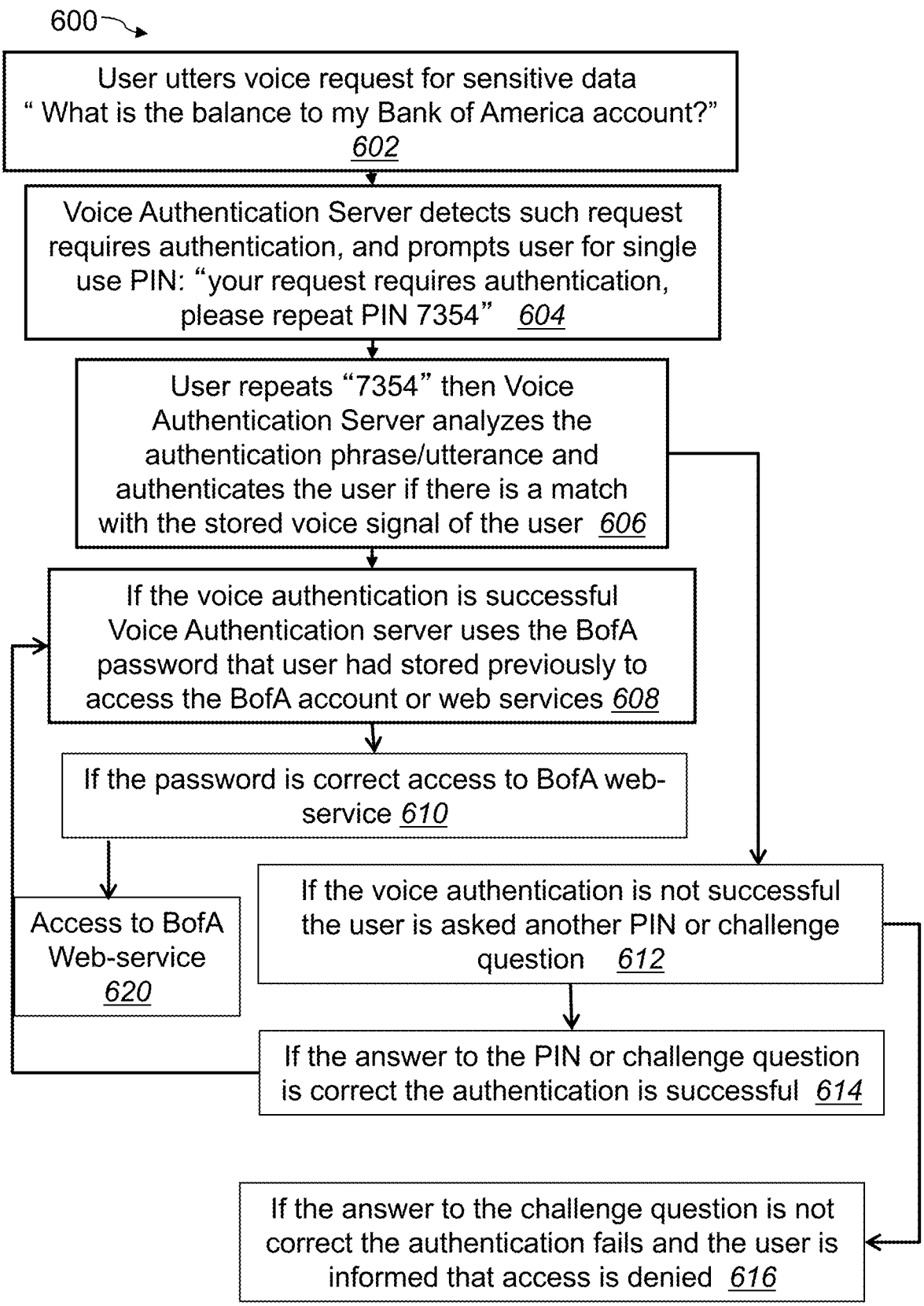
FIG. 7 depicts a process flow diagram of another embodiment of the single-point voice authentication according to this invention.

Referring to FIG. 7, illustrating further implementation detail, an authentication process 600 according to this invention includes the following steps. First a user utters a verbal request phrase for a specific web service in the presence of the communication system 101 (602). In one example, the authentication phrase includes the request for sensitive information for a specific web service, i.e., "What is the balance to my Bank of America account". The phrase is captured by the communication device 104 and is transmitted to the server, which detects that the request is for access to a web service that requires authentication. The voice authentication server (604) challenges the user by asking the user to repeat a one-time-use PIN generated by the authentication system such as "this request requires authentication please repeat PIN 7354". If user repeats PIN "7354" The central voice authentication server 110 analyzes the authentication phrase by comparing the voice pattern in the authentication phrase to the stored voice pattern in the user's account in the first database 114 (606). If there is a match with the stored voice pattern, the voice authentication is successful and the user's stored password for the specific web-service is used (608). If the provided password is correct (610) access to the specific web-service is provided (620). If the voice authentication is not successful the user is asked to try again with another PIN or a challenge question (612). The numbers used for PIN combination from 0 to 9, or challenge questions and answers are also stored in the user's account in the first database 114 and are chosen during the registration process. If the answer to PIN or the challenge question is correct, the voice authentication is successful and the user is directed to step (608) and uses the stored password for the specific web-service (608). If the password is correct (610), access to the specific web service is provided (620). If the answer to the challenge question is not correct, the authentication fails (616). As was mentioned above, the user must first set up their username and password ahead of time in the single point authentication mobile application, for a specific web service like Bank of America account if password for such web-service is required. Even if no password is required for such a web service, the user can choose to require Voice Authentication for such a web service. The user may also set a timer so that no additional voice authentication is required after 5 minutes or 10 minutes of a proper authentication.

Among the advantages of this invention may be one or more of the following. The invention provides a single-point access and voice authentication for login into a plurality of web-services. Although the detailed description herein refers to providing access to selected one(s) of a plurality of web services, it should be appreciated by those skilled in the art that the single points access and voice authentication according to the disclosure could similarly provide access to a selected web server, and that selected web server(s) may provide access to one or a number of web services in a manner as described. The single point voice authentication system of the present invention interfaces with a plurality of voice based artificial intelligence systems and platforms. Many such voice based artificial intelligence systems and platforms like Siri, or Google Now, or Cortana are tied to specific devices or device Operating Systems (OS), and not compatible across devices or OS, this invention enables access to services exposed by the APIs from these platforms across devices and OS's. The user does not have to register with each individual web-service and store individual voice authentication signals. The voice authentication system of the present invention provides "hands-free" secure access to web-services and accounts. Also if the user wants to add a level of authentication to their voice interface for access of sensitive data like bank account info, or ordering products or pizza, etc. this single point authentication system can help reduce the chance of fraudulent use and give peace of mind to the user in case their mobile device and/or headset is stolen or lost.

It should be appreciated that various modifications may be made without departing from the spirit and scope of the invention. Accordingly, other embodiments are within the scope of the following claims.

What is claimed is:

1. A voice authentication system comprising:
a plurality of web services;
a user device receiving, from a user, a vocal authentication command and a vocal selection command, the vocal selection command including a vocal request for access to a selected one of the plurality of web services; and
a central voice authentication server including a first database storing a voice pattern of the user, the central voice authentication server including a computing processor being configured to:
receive the vocal authentication command from the user device;
generate an extracted voice pattern from the vocal authentication command;
authenticate the user device by comparing the extracted voice pattern with the voice pattern stored in the first database for login to each of the plurality of web services;
receive the vocal selection command from the user device upon successful authentication of the user device;
determine, from the vocal selection command, the selected web service; and
provide the user device with the access to the selected web service based on the authentication of the user device by the central voice authentication server;
wherein each of the plurality of web services requires an access credential, and the central voice authentication server further includes a second database storing access credentials of the plurality of web services, the central voice authentication server being further configured to provide the user device with the access to the selected web service when the authentication satisfies the access credential of the selected web service.

2. The voice authentication system of claim 1 wherein the central voice authentication server is further configured to:
request additional authentication credentials when the authentication does not satisfy the access credential of the selected web service;
receive additional authentication credentials from the user device; and
provide the user device with the access to the selected web service when the additional authentication credentials from the user device satisfies the access credential of the selected web service.

3. The voice authentication system of claim 1 wherein the first database further stores a challenge question and an answer corresponding to the challenge question, and the central voice authentication server is further configured to:
request an answer from the user device for the challenge question when the authentication is not successful;
compare the answer from the user device with the answer stored in the first database; and
provide the user device with the access to the selected web service when the answer from the user device matches with the answer stored in the first database.

4. The voice authentication system of claim 1 wherein the central voice authentication server requests the voice selection command from the user device and receives the voice selection command from the user device when the authentication is successful.

5. A method of operating a central voice authentication server, comprising:
receiving, from a user device, a vocal authentication command of a user;
generating an extracted voice pattern from the vocal authentication command;
authenticating the user device for login to each of a plurality of web services by comparing the extracted voice pattern with a voice pattern of the user stored in a first database of the central voice authentication server;
requesting a vocal selection command of the user, the vocal selection command including a vocal request for access to a selected one of the plurality of web services;
receiving, from the user device, the vocal selection command upon successful authentication of the user device;
determining, from the vocal selection command, the selected web service; and
providing the user device with the access to the selected web service based on the authentication of the user device by the central voice authentication server, wherein each of the plurality of web services requires an access credential, and the central voice authentication server further includes a second database storing access credentials of the plurality of web services, the method of operating the central voice authentication server further comprising steps of requesting the user device to provide the access credential for a selected one of the plurality of web services; and providing the user device with the access to the selected web service when the authentication satisfies the access credential of the selected web service.

6. The method of operating a central voice authentication server of claim 5, further comprising the steps of requesting additional authentication credentials when the authentication does not satisfy the access credential of the selected web service;

receiving additional authentication credentials from the user device; and providing the user device with the access to the selected web service when the additional authentication credentials from the user device satisfies the access credential of the selected web service.

7. The method of operating a central voice authentication server of claim 5 wherein the first database further stores a challenge question and an answer corresponding to the challenge question, and, the method of operating the central voice authentication server further comprises steps of, requesting an answer from the user device for the challenge question when the authentication is not successful;

comparing the answer from the user device with the answer stored in the first database; and providing the user device with the access to the selected web service when the answer from the user device matches with the answer stored in the first database.

8. The method of operating a central voice authentication server of claim 5 wherein the central voice authentication server requests the vocal selection command from the user device and receives the vocal selection command from the user device when the authentication is successful.

9. A method of operating a user device to obtain access to one of a plurality of web services, comprising:

receiving a vocal authentication command from a user;

transmitting the vocal authentication command to a central voice authentication server to enable the central voice authentication server to authenticate the user device by comparing an extracted voice pattern from the vocal authentication command with a voice pattern of the user stored in a first database of the central voice authentication server for login to each of a plurality of web services;

receiving a request for a vocal selection command of the user from the central voice authentication server, the vocal selection command including a vocal request for access to a selected one of the plurality of web services;

receiving, from the user, the vocal selection command;

transmitting the vocal selection command to the central voice authentication server to enable the central voice authentication server to determine, from the vocal selection command, the selected web service upon successful authentication of the user device; and accessing the selected web service via the access provided by the central voice authentication server based on the authentication of the user device by the central voice authentication server, wherein each of the plurality of web services requires an access credential, and the central voice authentication server further includes a second database storing access credentials of the plurality of web services, the method of operating the user device to obtain access to one of a plurality of web services further comprising steps of: receiving at the user device a request to provide the access credential for a selected one of the plurality of web services; and providing the user device with the access to the selected web service when the authentication satisfies the access credential of the selected web service.

10. The method of operating a user device to obtain access to one of a plurality of web services of claim 9, further comprising the steps of receiving a request to provide additional authentication credentials when the authentication does not satisfy the access credential of the selected web service;

receiving additional authentication credentials from the user device; and providing the user device with the access to the selected web service when the additional authentication credentials from the user device satisfies the access credential of the selected web service.

11. The method of operating a user device to obtain access to one of a plurality of web services of claim 9 wherein the first database further stores a challenge question and an answer corresponding to the challenge question, and, the method of operating a user device to obtain access to one of a plurality of web services further comprises steps of, providing an answer from the user device for the challenge question when the authentication is not successful;

comparing the answer from the user device with the answer stored in the first database; and receiving at the user device access to the selected web service when the answer from the user device matches with the answer stored in the first database.

12. The method of operating a user device to obtain access to one of a plurality of web services of claim 9 wherein the user device receives from the central voice authentication server a request for the vocal selection command from the user device and sending the vocal selection command from the user device when the authentication is successful.

\* \* \* \* \*